United States Patent
Piroddi (10) Patent No.: US 9,648,339 B2
(45) Date of Patent: May 9, 2017

(54) IMAGE PROCESSING WITH SEGMENTATION USING DIRECTIONALLY-ACCUMULATED DIFFERENCE-IMAGE PIXEL VALUES

(71) Applicant: Snell Advance Media Limited, Newbury, Berkshire (GB)

(72) Inventor: Roberta Piroddi, Guildford (GB)

(73) Assignee: Snell Advanced Media Limited, Newbury (GB)

( * ) Notice: Subject to any disclaimer, the term of this patent is extended or adjusted under 35 U.S.C. 154(b) by 314 days.

(21) Appl. No.: 14/289,179

(22) Filed: May 28, 2014

(65) Prior Publication Data
US 2014/0355682 A1 Dec. 4, 2014

(30) Foreign Application Priority Data
May 28, 2013 (GB) .................................. 1309489.1

(51) Int. Cl.
H04N 19/577 (2014.01)
H04N 19/48 (2014.01)
G06T 7/20 (2017.01)

(52) U.S. Cl.
CPC ........... *H04N 19/48* (2014.11); *G06T 7/2053* (2013.01); *G06T 2207/10016* (2013.01); *G06T 2207/20224* (2013.01); *H04N 19/577* (2014.11)

(58) Field of Classification Search
CPC .... H04N 19/48; H04N 19/577; G06T 7/2053; G06T 2207/10016; G06T 2207/20224
See application file for complete search history.

(56) References Cited

U.S. PATENT DOCUMENTS

| | | | | |
|---|---|---|---|---|
| 3,890,462 A * | 6/1975 | Limb | .................... | G01S 3/7864 |
| | | | | 348/135 |
| 4,052,161 A * | 10/1977 | Atwood | ............... | G01N 35/026 |
| | | | | 356/246 |
| 4,923,299 A * | 5/1990 | Anderson | ............ | G01C 19/727 |
| | | | | 356/470 |
| 5,262,968 A * | 11/1993 | Coffield | .................... | G06J 3/00 |
| | | | | 708/5 |
| 5,515,448 A * | 5/1996 | Nishitani | ............... | B60Q 9/008 |
| | | | | 340/435 |
| 6,360,017 B1 | 3/2002 | Chiu | | |

(Continued)

FOREIGN PATENT DOCUMENTS

WO         98/44739 A1     10/1998

OTHER PUBLICATIONS

Search Report dated Nov. 14, 2013, issued in corresponding British Application No. GB1309489.1, filed May 28, 2013, 1 page.

*Primary Examiner* — Jay Patel
*Assistant Examiner* — Joseph Suh
(74) *Attorney, Agent, or Firm* — Christensen O'Connor Johnson; Matthew Balint; John Denkenberger (57) ABSTRACT

In the segmentation of an image into spatial regions, an image region is identified by forming difference-image pixel values from the chosen image and at least one other image in the image sequence and accumulating those difference-image pixel values horizontally and vertically. Co-located horizontal and vertical accumulations are combined and utilized in identifying the region. Difference-image pixel values can also be accumulated along other lines which pass through a point of interest.

17 Claims, 11 Drawing Sheets

(56) References Cited

U.S. PATENT DOCUMENTS

| | | | | |
|---|---|---|---|---|
| 6,486,909 B1* | 11/2002 | Pirim | ................... | G06T 7/2053 348/143 |
| 2002/0018139 A1* | 2/2002 | Yamagata | ............... | G01B 11/00 348/333.09 |
| 2002/0036705 A1* | 3/2002 | Lee | ....................... | H04N 7/012 348/459 |
| 2002/0131494 A1* | 9/2002 | Fukuda | ................. | H04N 19/61 375/240.03 |
| 2002/0136457 A1* | 9/2002 | Onishi | ............... | G06K 9/00154 382/209 |
| 2002/0181790 A1* | 12/2002 | Nakata | ................. | H04N 19/105 382/236 |
| 2003/0115590 A1* | 6/2003 | Haraguchi | ........... | H04N 7/0112 725/20 |
| 2003/0161516 A1* | 8/2003 | Vuylsteke | ............... | G06T 5/009 382/128 |
| 2004/0047596 A1* | 3/2004 | Chevallier | ............ | H04N 5/147 386/343 |
| 2004/0101199 A1* | 5/2004 | Lee | ..................... | G06K 9/6203 382/209 |
| 2005/0007159 A1* | 1/2005 | Kondo | ..................... | G06T 1/00 327/100 |
| 2006/0114526 A1* | 6/2006 | Hasegawa | ............ | G06T 3/4015 358/518 |
| 2006/0232666 A1* | 10/2006 | Op De Beeck | ....... | G06T 7/0067 348/51 |
| 2007/0161891 A1* | 7/2007 | Moore | ................... | A61B 5/055 600/421 |
| 2007/0223835 A1* | 9/2007 | Yamada | ............... | H04N 19/176 382/268 |
| 2008/0240246 A1* | 10/2008 | Lee | ....................... | H04N 19/176 375/240.16 |
| 2010/0013953 A1* | 1/2010 | Niikura | ............... | H04N 5/2357 348/226.1 |
| 2010/0017448 A1* | 1/2010 | Kobayashi | .............. | G06F 5/015 708/209 |
| 2010/0104183 A1* | 4/2010 | Hasegawa | ............ | G06T 3/4015 382/167 |
| 2010/0128790 A1* | 5/2010 | Koana | .................... | H04N 19/51 375/240.16 |
| 2011/0128449 A1* | 6/2011 | Ishihara | ................... | G09G 3/20 348/701 |
| 2011/0142283 A1* | 6/2011 | Huang | .................. | G06T 7/2006 382/103 |
| 2011/0261255 A1* | 10/2011 | Nagata | ................... | G09G 5/005 348/441 |
| 2013/0293742 A1* | 11/2013 | Moon | ................... | H04N 5/2357 348/226.1 |
| 2014/0212047 A1* | 7/2014 | Ferman | ................ | G06K 9/3283 382/195 |
| 2014/0241612 A1* | 8/2014 | Rhemann | ............... | G06T 7/0075 382/154 |

* cited by examiner

| 3 | 3 | 3 | 3 | 3 | 3 | 3 | 3 | 3 | 3 | 2 | 1 |
|---|---|---|---|---|---|---|---|---|---|---|---|
| 4 | 4 | 3 | 3 | 2 | 2 | 2 | 2 | 2 | 2 | 1 | 1 |
| 4 | 4 | 3 | 3 | 2 | 2 | 2 | 2 | 2 | 2 | 1 | 1 |
| 7 | 7 | 6 | 6 | 5 | 5 | 4 | 3 | 2 | 1 | 1 | 1 |
| 5 | 5 | 4 | 3 | 2 | 2 | 1 | 1 | 1 |   |   |   |
| 2 | 2 | 2 | 2 | 2 | 2 | 1 | 1 | 1 | 1 |   |   |
| 4 | 4 | 4 | 4 | 4 | 4 | 3 | 2 | 1 | 1 |   |   |
|   |   |   |   |   |   |   |   |   |   |   |   |
| 3 | 3 | 2 | 1 |   |   |   |   |   |   |   |   |
| 1 | 1 | 1 | 1 |   |   |   |   |   |   |   |   |
| 4 | 3 | 2 | 1 |   |   |   |   |   |   |   |   |
|   |   |   |   |   |   |   |   |   |   |   |   |

Figure 6

|   |   |   |   |   |   |   |   |   | 1 | 1 | 1 |
|---|---|---|---|---|---|---|---|---|---|---|---|
|   | 1 |   | 1 |   |   |   |   |   | 2 | 1 | 2 |
|   | 2 |   | 2 |   |   |   |   |   | 3 | 1 | 3 |
|   | 3 |   | 3 |   | 1 | 1 | 1 | 1 | 3 | 1 | 4 |
|   | 4 | 1 | 4 |   | 2 | 1 | 1 | 2 | 3 | 1 | 4 |
|   | 4 | 1 | 4 |   | 3 | 1 | 1 | 2 | 4 | 1 | 4 |
|   | 4 | 1 | 4 |   | 4 | 2 | 2 | 2 | 5 | 1 | 4 |
|   | 4 | 1 | 4 |   | 4 | 2 | 2 | 2 | 5 | 1 | 4 |
|   | 5 | 2 | 5 |   | 4 | 2 | 2 | 2 | 5 | 1 | 4 |
|   | 5 | 2 | 6 |   | 4 | 2 | 2 | 2 | 5 | 1 | 4 |
| 1 | 6 | 3 | 7 |   | 4 | 2 | 2 | 2 | 5 | 1 | 4 |
| 1 | 6 | 3 | 7 |   | 4 | 2 | 2 | 2 | 5 | 1 | 4 |

Figure 7

| 1 | 6 | 3 | 7 |   | 4 | 2 | 2 | 2 | 5 | 1 | 4 |
| 1 | 6 | 3 | 7 |   | 4 | 2 | 2 | 2 | 4 |   | 3 |
| 1 | 5 | 3 | 6 |   | 4 | 2 | 2 | 2 | 3 |   | 2 |
| 1 | 4 | 3 | 5 |   | 4 | 2 | 2 | 2 | 2 |   | 1 |
| 1 | 3 | 3 | 4 |   | 3 | 1 | 1 | 1 | 2 |   |   |
| 1 | 2 | 2 | 3 |   | 2 | 1 | 1 |   | 2 |   |   |
| 1 | 2 | 2 | 3 |   | 1 | 1 | 1 |   | 1 |   |   |
| 1 | 2 | 2 | 3 |   |   |   |   |   |   |   |   |
| 1 | 2 | 2 | 3 |   |   |   |   |   |   |   |   |
| 1 | 1 | 1 | 2 |   |   |   |   |   |   |   |   |
| 1 | 1 | 1 | 1 |   |   |   |   |   |   |   |   |
|   |   |   |   |   |   |   |   |   |   |   |   |

Figure 8

|   |   |   |   |   |   |   |   |   | 3 | 4 | 3 |
|   | 4 | 3 | 6 | 4 | 4 | 4 | 4 | 4 | 6 | 3 | 4 |
|   | 4 | 3 | 6 | 4 | 4 | 4 | 4 | 4 | 6 | 3 | 4 |
|   | 7 | 6 | 12 | 10 | 15 | 16 | 15 | 12 | 6 | 6 | 7 |
|   | 5 | 8 | 9 | 6 | 8 | 4 | 4 | 5 |   |   |   |
|   |   |   |   |   | 2 | 1 | 1 | 1 | 2 |   |   |
|   |   |   |   |   | 4 | 6 | 6 | 3 | 4 |   |   |
|   |   |   |   |   |   |   |   |   |   |   |   |
|   | 3 | 4 | 3 |   |   |   |   |   |   |   |   |
|   |   |   | 1 |   |   |   |   |   |   |   |   |
| 4 | 6 | 6 | 4 |   |   |   |   |   |   |   |   |
|   |   |   |   |   |   |   |   |   |   |   |   |

Figure 9

|   |   |   |   |   |   |   |   |   | 5 | 1 | 4 |
|---|---|---|---|---|---|---|---|---|---|---|---|
|   | 6 |   | 7 |   |   |   |   |   | 8 |   | 6 |
|   | 10|   | 12|   |   |   |   |   | 9 |   | 6 |
|   | 12|   | 15|   | 4 | 2 | 2 | 2 | 6 |   | 4 |
|   | 12| 3 | 16|   | 6 | 1 | 1 | 2 | 6 |   |   |
|   | 8 | 2 | 12|   | 6 | 1 | 1 |   | 8 |   |   |
|   | 8 | 2 | 12|   | 4 | 2 | 2 |   | 5 |   |   |
|   | 8 | 2 | 12|   |   |   |   |   |   |   |   |
|   |10 | 4 | 15|   |   |   |   |   |   |   |   |
|   | 5 | 2 | 12|   |   |   |   |   |   |   |   |
| 1 | 6 | 3 | 7 |   |   |   |   |   |   |   |   |
|   |   |   |   |   |   |   |   |   |   |   |   |

Figure 10

|   |   |   |   |   |   |   |   |   | 15 | 4 | 12 |
|---|---|---|---|---|---|---|---|---|----|---|----|
|   | 24|   | 42|   |   |   |   |   | 48 |   | 24 |
|   | 40|   | 72|   |   |   |   |   | 54 |   | 24 |
|   | 84|   |180|   | 60| 32| 30| 24| 36 |   | 28 |
|   | 60| 24|144|   | 48| 4 | 4 | 10|    |   |    |
|   |   |   |   |   | 12| 1 | 1 |   | 16 |   |    |
|   |   |   |   |   | 16| 12| 12|   | 20 |   |    |
|   |   |   |   |   |   |   |   |   |    |   |    |
|   | 30| 16| 45|   |   |   |   |   |    |   |    |
|   |   |   | 12|   |   |   |   |   |    |   |    |
| 4 | 36| 18| 28|   |   |   |   |   |    |   |    |
|   |   |   |   |   |   |   |   |   |    |   |    |

IMAGE PROCESSING WITH SEGMENTATION USING DIRECTIONALLY-ACCUMULATED DIFFERENCE-IMAGE PIXEL VALUES

FIELD OF INVENTION

This invention concerns image processing, and in particular the segmentation into spatial regions of image data describing an image within a sequence of images.

BACKGROUND OF THE INVENTION

Many image processing tasks are simplified if the image can be segmented into spatial regions where a region has some unifying property. For example a particular region may correspond with the extent of a portrayed object. Examples of processes that can benefit from image segmentation include: data compression, where similar coding decisions can be applied over a particular segment; motion compensated processing, where the same motion vector can be applied to a particular region; and, re-framing, where there is a need to ensure that a particular segment remains within the frame.

Known methods of image segmentation include the detection of edges by means of spatial filtering of the image and then bridging any gaps in the detected edges to form a segment boundary. These methods can be complex and detected edges may not correspond to the edges of image regions.

SUMMARY OF THE INVENTION

The principle of the invention is to analyse the differences in pixel values between a pair of related images, and to locate regions that are at least partially enclosed by high difference values.

The invention consists in a method and apparatus for identifying a region within a chosen image that is part of an image sequence from products of directionally-accumulated difference-image pixel values.

Suitably, pixel values are accumulated along straight lines of pixels.

In a preferred embodiment the difference-image is a DFD comprising displaced frame difference values of pixels derived from a motion estimation process applied to images in the sequence.

Advantageously, the difference-image is derived from at least an image earlier in the sequence than the said chosen image and at least an image later in the sequence than the said chosen image.

Co-located pixel values resulting from accumulation in opposing directions can be multiplied together.

In certain embodiments, co-located pixel values derived from values accumulated along intersecting lines are multiplied together.

Preferably, the magnitude of a product of accumulated pixel values for a pixel is used to identify that pixel as part of an image region.

And, the magnitude of a weighted sum of product values for a pixel is compared with a threshold and that pixel is considered to form part of an image region when the threshold is exceeded.

Advantageously, a product of pixel values is modified by a non-linear function prior to the comparison.

DETAILED DESCRIPTION OF THE INVENTION

There are a number of difference measures that can be derived for a pair of images within an image sequence and which are suitable inputs to a segmentation process according to the invention. The simplest measure is the difference-image resulting from the subtraction of the values of pixels in one image from the values of co-located pixels in another image. Typically luminance values for the pixels are subtracted, but other pixel values, for example hue or saturation values, can be used.

Another particularly useful image difference to use is the 'displaced frame difference' (DFD). In motion compensated processing, pixels of a first temporal sample of a scene are shifted, that is to say displaced, by motion vectors that have been derived from a motion estimation process, so that they occupy positions they would occupy in a second, available, temporal sample. The image comprising the differences between the values of the displaced pixels of the first sample and the (unmodified) pixels of the second temporal sample is a DFD. The DFD will have large values at the boundaries of moving objects, and smaller values elsewhere. This is because pixels corresponding to freshly revealed or obscured parts of the background behind moving foreground objects will not be correctly described by the shifting of the foreground objects, even if the relevant motion vectors are accurate. The DFD is thus likely to indicate the boundaries of moving objects. However, the boundary is likely to be incomplete, and degraded by noise.

Figure 1:
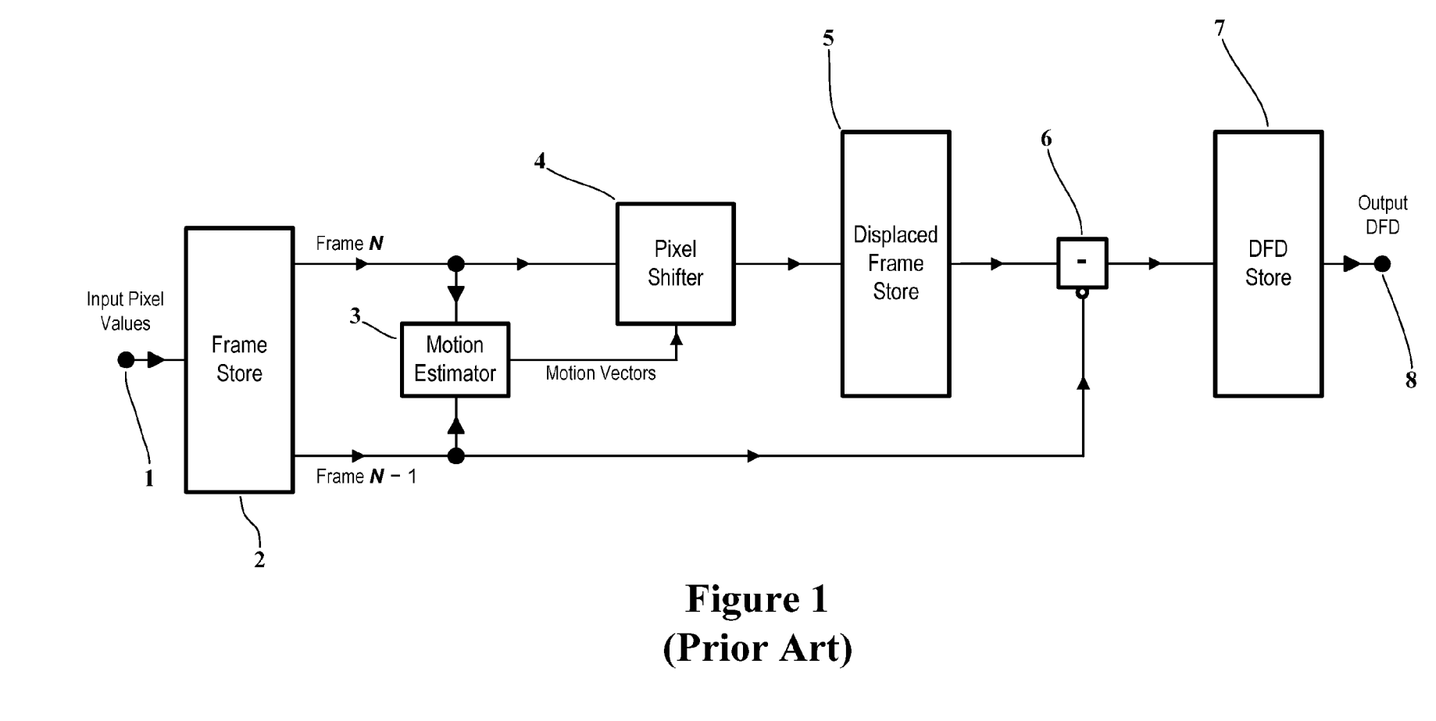
FIG. 1 shows a block diagram of a system for deriving a displaced frame difference (DFD) image for an image in a sequence of images, according to prior art.

FIG. 1 shows a typical, known example of the creation of a DFD. A stream of input pixel values (1) is input to a frame store (2). The pixel values (1) are the luminance values of the pixels of a sequence of image frames, each of which is a temporal sample of a scene. The frame store (2) stores, at least: a current frame at a position N in the sequence of frames; and, a preceding frame at a position N-1 in the sequence of frames.

A motion estimator (3) derives motion vectors that describe the change in position of portrayed objects between frame N and frame N-1. The motion estimator (3) may use—for example—either of the well-known 'block matching' or 'phase correlation' methods, and outputs a vector for every pixel of frame N. A pixel shifter (4) shifts (displaces) every pixel of frame N according to its respective motion vector, and the resulting 'motion compensated' frame is stored in a displaced frame store (5). A subtractor (6) subtracts the pixel values of frame N-1 from the values of co-located, shifted pixels of frame N, and the resulting image is stored as a DFD in a DFD store (7), whose output is available to subsequent processes via terminal (8).

The above-described process forms a 'backward' DFD between the current frame and the preceding frame. Analogous processing can be used to form a 'forward' DFD between the current frame and the succeeding frame. A combination of a forward DFD with a backward DFD is a particularly suitable input to the segmentation process that will be described. The combination can be an average, or a weighted average in which the forward and backward contributions to each pixel are determined from other image data, such as confidence values for forward and backward motion vectors.

In the description which follows the input to the segmentation process will be referred to as a DFD, however other difference-images that describe differences between images at different points in an image sequence can be used. Suitable difference-images can be derived from either two or three images from an image sequence.

Figure 2:
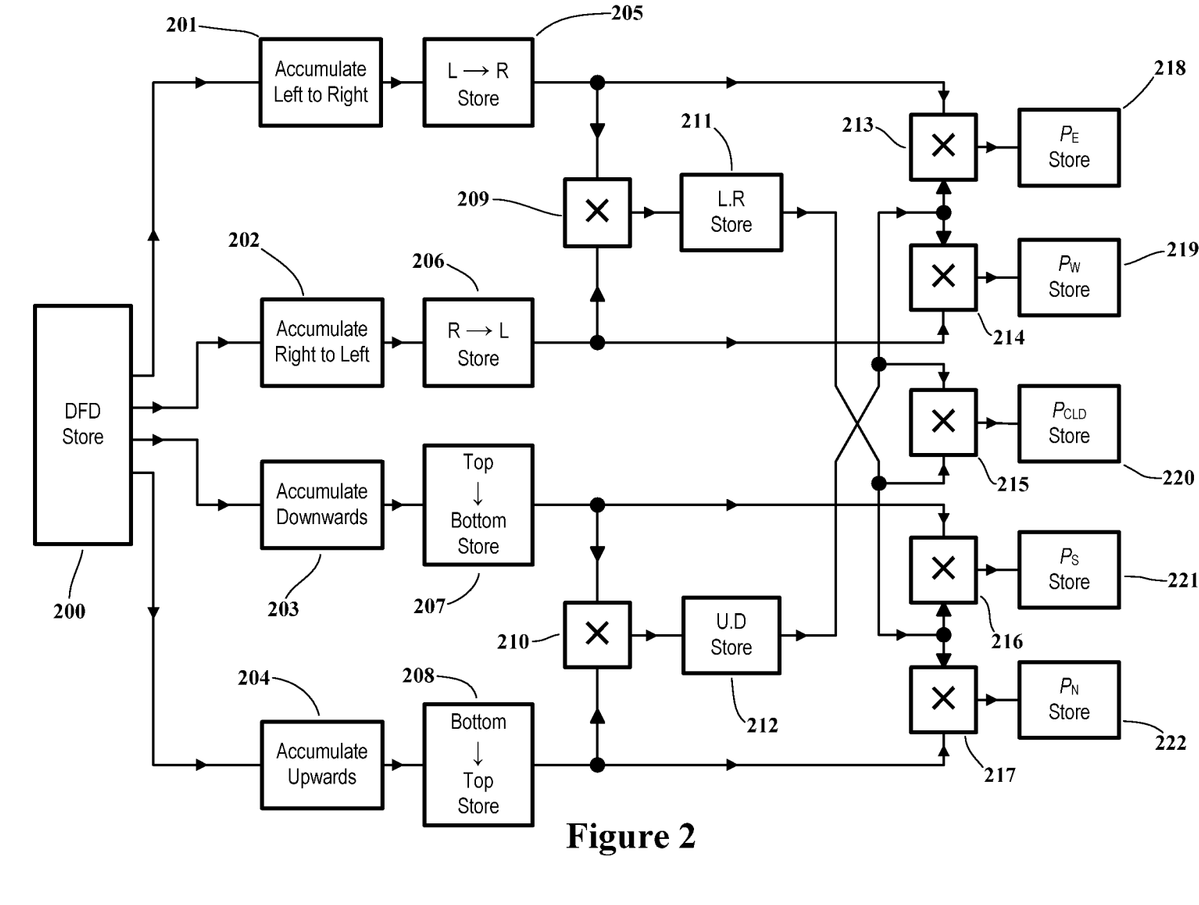
FIG. 2 shows a block diagram of a system for deriving a set of five DFD products from a DFD according to an embodiment of the invention.

The input DFD is processed, as shown in FIG. 2, so as to obtain five different measures that indicate that a pixel is part of a contiguous region that includes its neighbouring pixels. A DFD store (200) contains the pixel values of the DFD for a frame. A left-to-right accumulation processor (201) horizontally accumulates the values of adjacent pixels of each line of the DFD from left to right and stores the resulting image in an L→R store (205). A suitable accumulation process is described by the equation:

$$P_L(i, j) = P_{DFD}(i, j) + P_L(i-1, j) \quad [1]$$

Where:
$P_L(i, j)$ is the value of the left to right accumulated pixel at horizontal position i on line j of the accumulated image;
The index i counts from left to right;
The index j counts from top to bottom;
The accumulation proceeds from left to right; and,
$P_{DFD}(i, j)$ is the value of the DFD pixel at horizontal position i on line j of the DFD.

In the accumulation process pixel positions outside the image area (for example negative values of i or j) are assumed to be zero.

Figure 3:
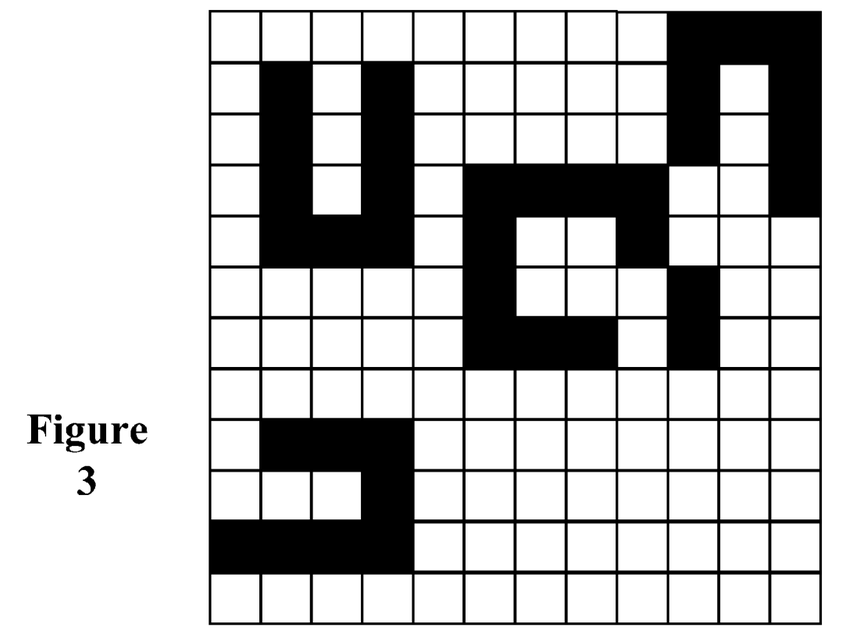
FIG. 3 shows an exemplary DFD image.
Figure 4:
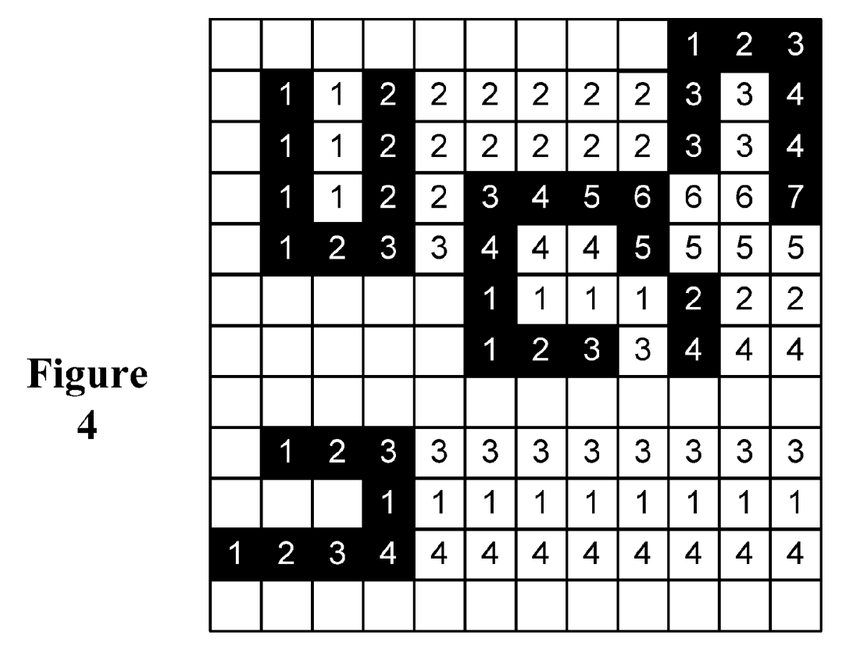
FIG. 4 shows the result of left to right accumulation of the pixel values of the FIG. 3 image.

An example of this accumulation process will now be explained with reference to FIGS. 3 and 4. FIG. 3 shows a hypothetical DFD image comprising 12 lines of pixels, with 12 pixels on each line. For simplicity, the pixel DFD values are assumed to be either one, shown black in the figures, or zero. The result of applying left to right accumulation according to equation [1] to the image of FIG. 3 is shown in FIG. 4. In FIG. 4 the respective accumulated values are shown at each pixel position.

In the process shown in FIG. 2 the pixel values shown in FIG. 4 are stored in the L→R store (205). Three further accumulation processes are applied to the content of the DFD store (200). A right to left accumulation process (202) derives accumulated values according to equation [2] below, and these values are stored in an R→L store (206).

$$P_R(i, j) = P_{DFD}(i, j) + P_R(i+1, j) \quad [2]$$

Where:
$P_R(i, j)$ is the value of the right to left accumulated pixel at horizontal position i on line j of the accumulated image; and,
The accumulation proceeds from right to left.

Figure 5:
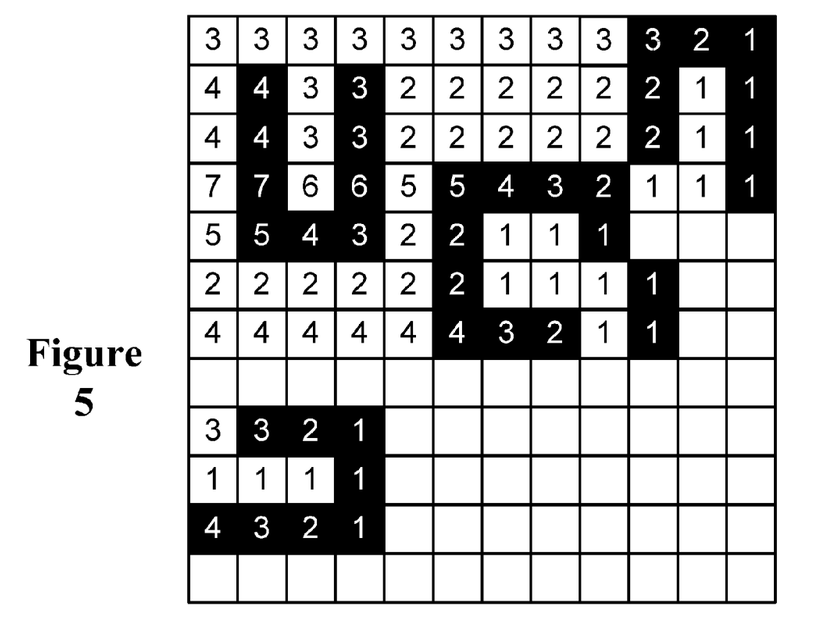
FIG. 5 shows the result of right to left accumulation of the pixel values of the FIG. 3 image.

The result of applying right to left accumulation to the image of FIG. 3 is shown in FIG. 5.

A downward accumulation process (203) derives accumulated values according to equation [3] below, and these values are stored in a Top→Bottom store (207).

$$P_D(i, j) = P_{DFD}(i, j) + P_D(i, j-1) \quad [3]$$

Where:
$P_D(i, j)$ is the value of the downward accumulated pixel at horizontal position i on line j of the accumulated image; and,
The accumulation proceeds from top to bottom.

Figure 6:
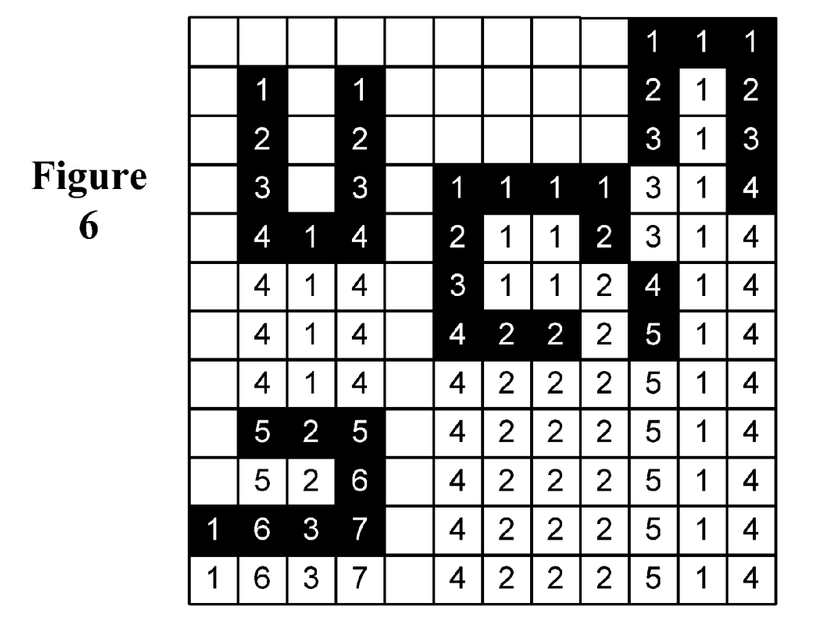
FIG. 6 shows the result of top to bottom accumulation of the pixel values of the FIG. 3 image.

The result of applying downward accumulation to the image of FIG. 3 is shown in FIG. 6.

An upward accumulation process (204) derives accumulated values according to equation [4] below, and these values are stored in a Bottom→Top store (208).

$$P_U(i, j) = P_{DFD}(i, j) + P_U(i, j+1) \quad [4]$$

Where:
$P_U(i, j)$ is the value of the upward accumulated pixel at horizontal position i on line j of the accumulated image; and,
The accumulation proceeds from bottom to top.

Figure 7:
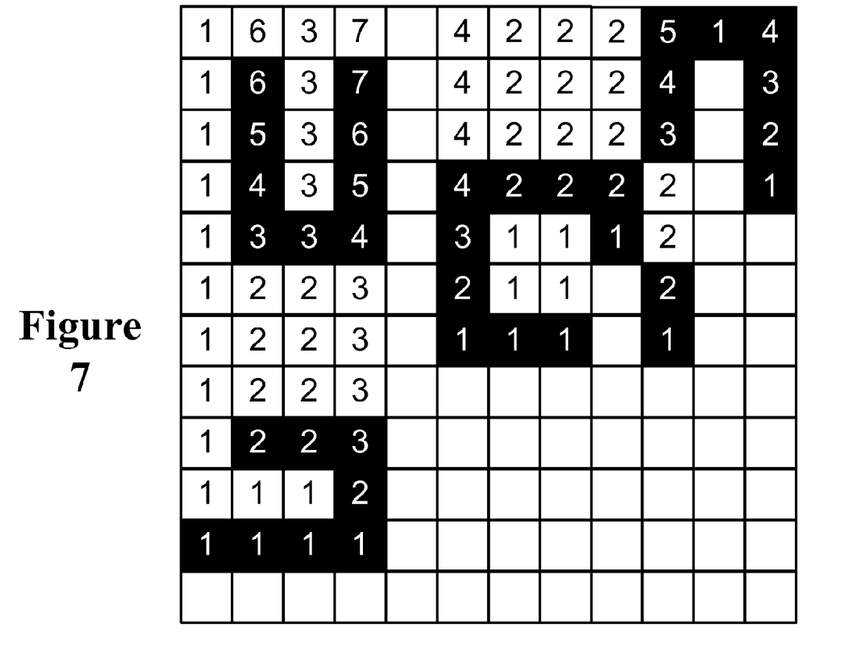
FIG. 7 shows the result of bottom to top accumulation of the pixel values of the FIG. 3 image.

The result of applying upward accumulation to the image of FIG. 3 is shown in FIG. 7.

The stored pixel values resulting from accumulation in opposing directions are multiplied together to identify pixels lying between non-zero-value DFD pixels. A multiplier (209) multiplies the left to right values from the L→R store (205) by the respective values from the R→L store (206), and the resulting product pixel values are stored in an 'L.R' store (211). This process is described by equation [5].

$$P_{LR}(i, j) = P_L(i, j) \times P_R(i, j) \quad [5]$$

Where:
$P_{LR}(i, j)$ is a product pixel value at horizontal position i on line j, that indicates the presence of non-zero-value DFD pixels to the left and right of the position (i, j).

Figure 8:
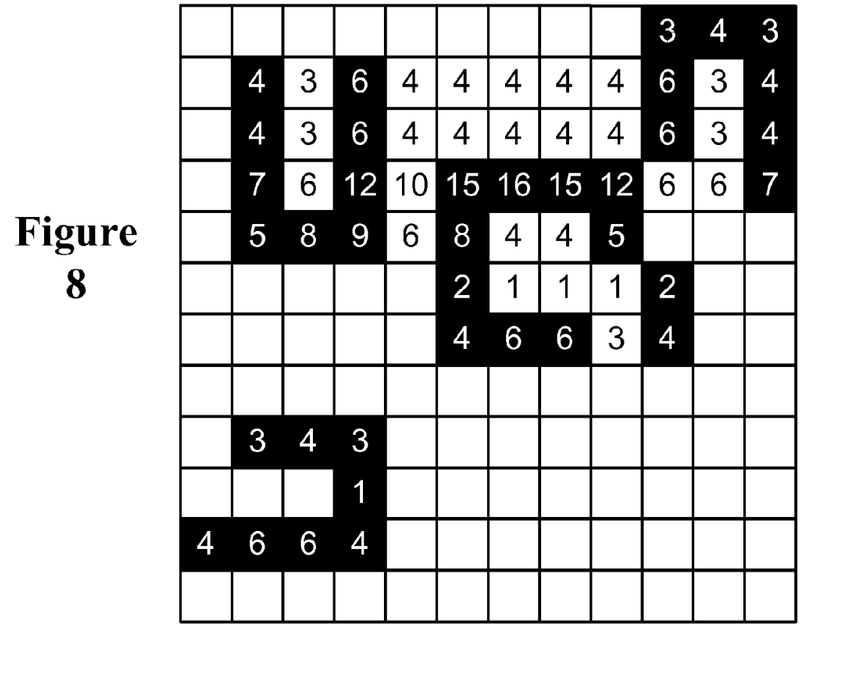
FIGS. 8 to 14 show product pixel values derived from the FIG. 3 image according to an embodiment of the invention.

The result of applying this L·R multiplication to the image of FIG. 3 is shown in FIG. 8, which shows the contents of the L·R store (211); locations having non-zero values are either locations where the DFD was non-zero, or are regions bounded on both left and right by non-zero-value DFD regions.

Similarly, a multiplier (210) multiplies the top to bottom values from the Top→Bottom store (207) by the respective values from the Bottom→Top store (208), and the resulting product pixel values are stored in a 'U·D' store (212). This process is described by equation [6].

$$P_{UD}(i, j) = P_U(i, j) \times P_D(i, j) \quad [6]$$

Where:
$P_{UD}(i, j)$ is a product pixel value at horizontal position i on line j, that indicates the presence of non-zero-value DFD pixels above and below the position (i, j).

Figure 9:
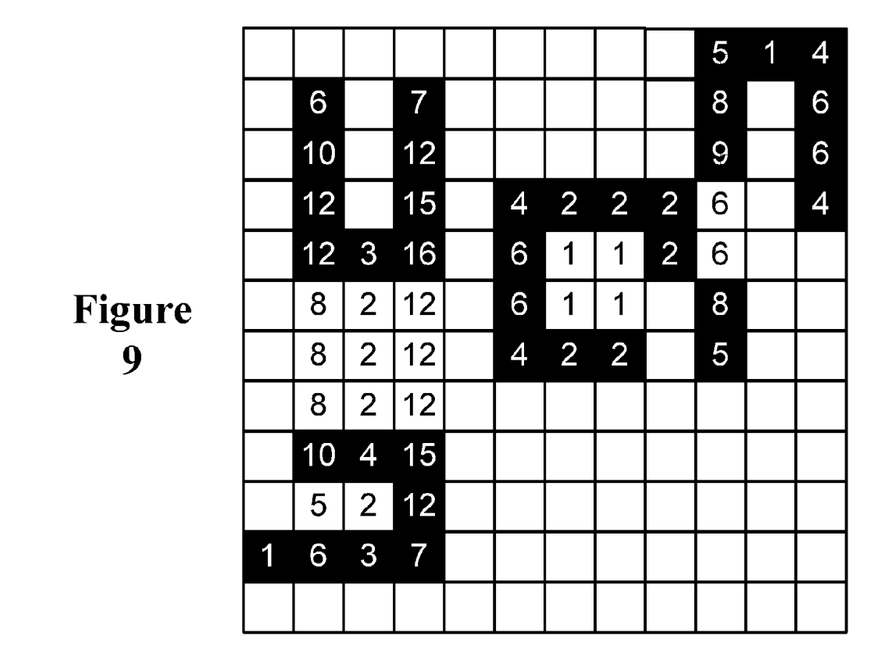

The result of applying this U·D multiplication to the image of FIG. 3 is shown in FIG. 9, which shows the contents of the U·D store (212); locations having non-zero values are either locations where the DFD was non-zero, or are regions bounded both above and below by non-zero-value DFD regions.

The contents of the L·R store (211) and the U·D store (212) are combined with each other, and with: the contents of the L→R store (205); the R→L store (206); the Top-→Bottom store (207); and, the bottom→top store (208). These combination processes identify five different types of image region.

Regions enclosed by non-zero-value DFD pixels on all four sides, that is to say left, right, top and bottom, are identified by multiplying (215) the values of co-located pixels from the L·R store (211) and the U·D store (212):

$$P_{CLD}(i, j) = P_{LR}(i, j) \times P_{UD}(i, j) \quad [7]$$

Where:

$P_{CLD}(i, j)$ is a product pixel value at horizontal position i on line j, that indicates the presence of non-zero-value DFD pixels left, right, above and below the position (i, j).

Figure 10:
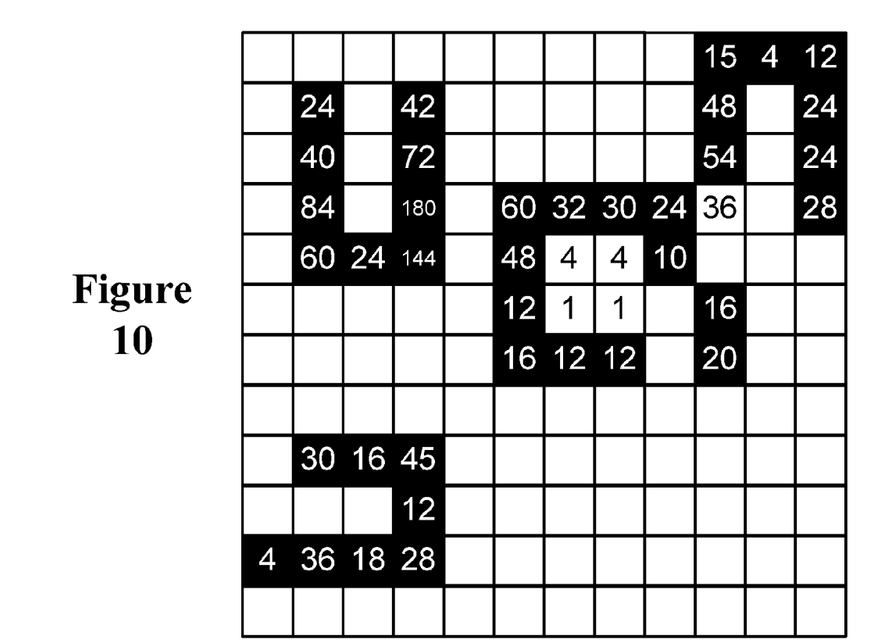

The result of applying this UD·LR multiplication to the image of FIG. 3 is shown in FIG. 10.

Regions bounded by non-zero-value DFD pixels to the left, above and below, are identified by multiplying (213) the values of co-located pixels from the U·D store (212) and the L→R store (205):

$$P_E(i, j) = P_{UD}(i, j) \times P_L(i, j) \quad [8]$$

Where:

$P_E(i, j)$ is a product pixel value at horizontal position i on line j, that indicates the presence of non-zero-value DFD pixels above, below and to the left of position (i, j).

Figure 11:
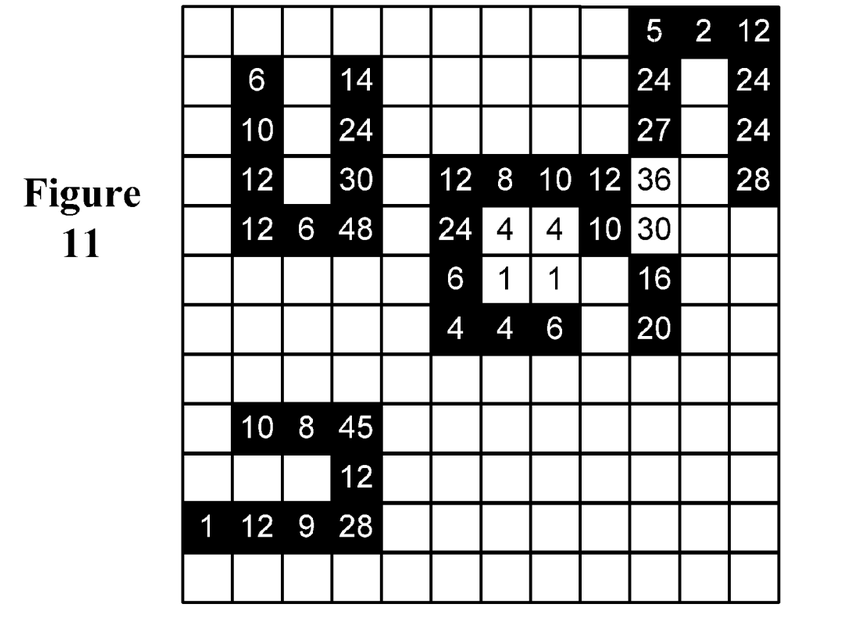

The result of applying this UD·L multiplication to the image of FIG. 3 is shown in FIG. 11.

Regions bounded by non-zero-value DFD pixels to the right, above and below, are identified by multiplying (214) the values of co-located pixels from the U·D store (212) and the R→L store (206):

$$P_W(i, j) = P_{UD}(i, j) \times P_R(i, j) \quad [9]$$

Where:

$P_W(i, j)$ is a product pixel value at horizontal position i on line j, that indicates the presence of non-zero-value DFD pixels above, below and to the right of position (i, j).

Figure 12:
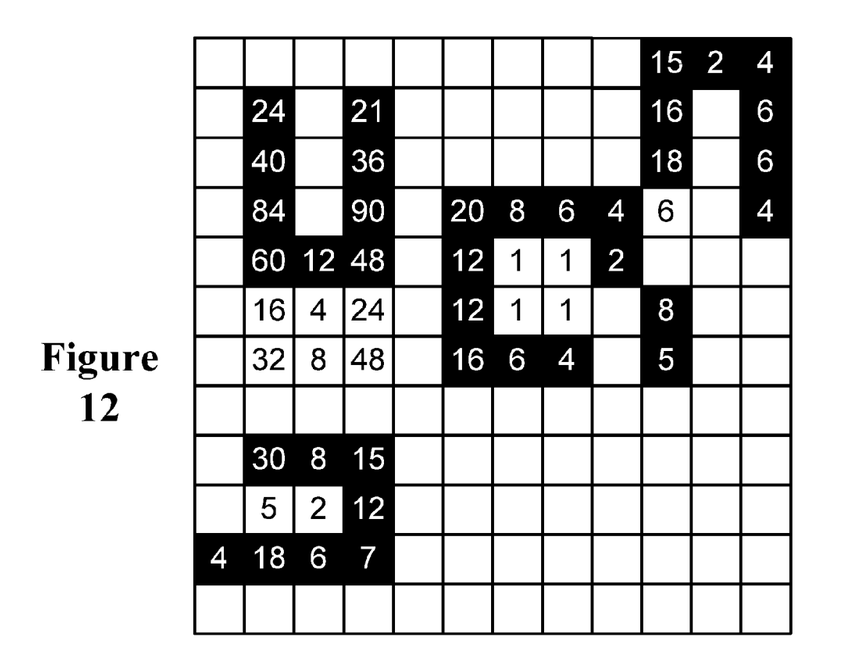

The result of applying this UD·R multiplication to the image of FIG. 3 is shown in FIG. 12.

Regions bounded by non-zero-value DFD pixels above, to left, and right, are identified by multiplying (216) the values of co-located pixels from the L·R store (211) and the top→bottom store (207):

$$P_S(i, j) = P_{LR}(i, j) \times P_D(i, j) \quad [10]$$

Where:

$P_S(i, j)$ is a product pixel value at horizontal position i on line j, that indicates the presence of non-zero-value DFD pixels above, to left, and right of position (i, j).

Figure 13:
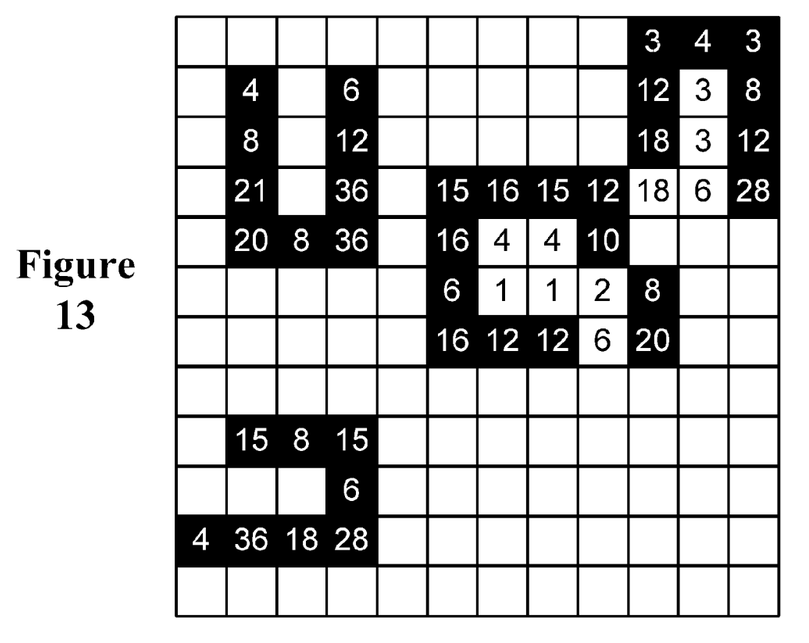

The result of applying this LR·D multiplication to the image of FIG. 3 is shown in FIG. 13.

And finally, regions bounded by non-zero-value DFD pixels below, to left, and right, are identified by multiplying (217) the values of co-located pixels from the L·R store (211) and the bottom→top store (208):

$$P_N(i, j) = P_{LR}(i, j) \times P_U(i, j) \quad [11]$$

Where:

$P_N(i, j)$ is a product pixel value at horizontal position i on line j, that indicates the presence of non-zero-value DFD pixels below, to left, and right of position (i, j).

Figure 14:
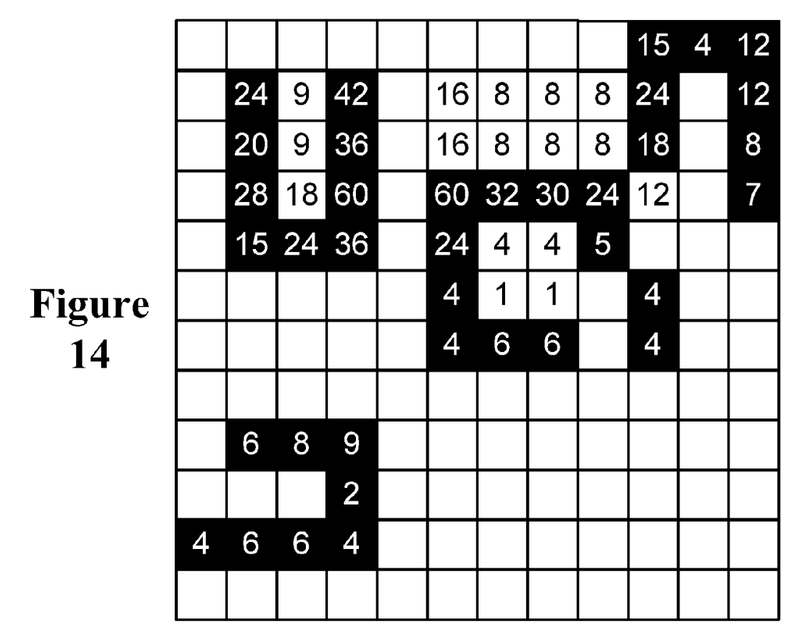

The result of applying this LR·U multiplication to the image of FIG. 3 is shown in FIG. 14.

The five DFD products $P_{CD}$, $P_E$, $P_W$, $P_S$, and $P_N$ all give indications that a pixel is part of a region enclosed by a non-zero-value DFD, or is part of the enclosing non-zero-value DFD. In the system of FIG. 2 each product is stored as an image in a respective one of a set of product stores (218) to (222) inclusive.

As explained below, real DFD images rarely have zero-value DFDs; areas that 'match' each other after motion compensation will typically give a smaller DFD than other areas. However, the above-described processing of DFD values will identify enclosed areas by giving higher outputs in enclosed areas than in unenclosed areas.

Any of these DFD product values can therefore be used, either alone or in combination, as part of a segmentation process that identifies portrayed objects. Because they are products, the dynamic range of these five values is likely to be wide. However, the useful information in a DFD value is confined to the lower part of its dynamic range. The lowest part of the range will be occupied by noise, even if the motion vector is correct; but, when there is an occlusion or and incorrect vector, the magnitude of the DFD will depend on the image content and may have any value above the noise floor (limited only by the coding range of the video data).

It is therefore helpful to modify the dynamic range of either the DFD, or a DFD product, to reduce the effect of noise and to reduce the contribution of the highest values. This can be achieved by clipping, limiting and/or applying a non linear function. One suitable function is a sigmoid function. Another suitable option is to take the logarithm of the DFD, or DFD product, and discard all values below a low-value threshold.

The five DFD products can be combined, for example in a weighted sum. $P_{CLD}$ may be given a higher weight because it is evidence of four directions of limitation, as compared to the three directions of limitation represented by the other four DFD products. The weighted sum of non-linearly-processed DFD products can be compared with a threshold, and contiguous pixel positions corresponding to values above the threshold identified as belonging to an image segment.

A suitable threshold value can be found by a 'training' process in which the extent of regions corresponding to pixel value above a trial threshold value are compared with an observer's assessment of the image and the threshold adjusted to achieve an optimum segmentation.

In the processing described above, cumulative summations of DFD values, from one image edge to the opposite image edge, are made along lines of horizontally adjacent pixels, and lines of vertically adjacent pixels. Other straight lines of pixels can be used; lines of pixels in more than two directions can be used; and/or, the summation may be limited to a region of interest within the image. Some suitable examples will now be described with reference to FIGS. 15 and 16.

Figure 15:
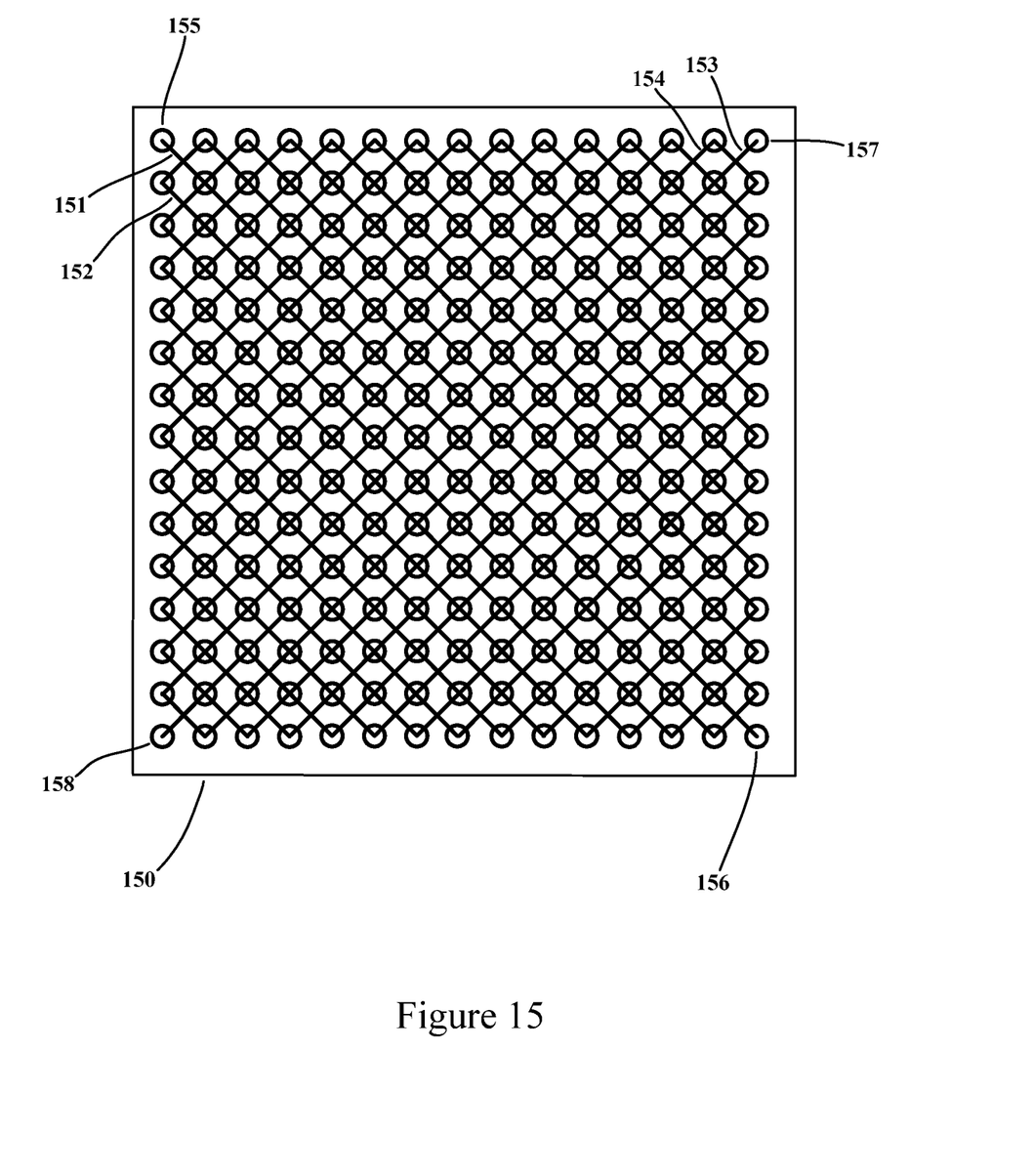
FIG. 15 shows diagonal lines of pixels within an image area.

FIG. 15 shows the positions of pixels within a rectangular image area (150). The positions of the pixels are indicated by circles. Two sets of diagonal lines of adjacent pixels are shown. For example: the lines (151) and (152) in the direction from top-left to bottom-right; and, the lines (153) and (154) in the direction from top-right to bottom-left. In processing according to the invention to locate image regions within the image area (150) cumulative sums along all of these lines are formed; including, for example:

the cumulative sum along the line (151) starting with pixel (155) and ending with the pixel (156), and the opposing cumulative sum starting with pixel (156) and ending with the pixel (155); and the cumulative sum along the line (153) starting with pixel (157) and ending with the pixel (158), and the opposing sum starting with pixel (158) and ending with the pixel (157).

Figure 16:
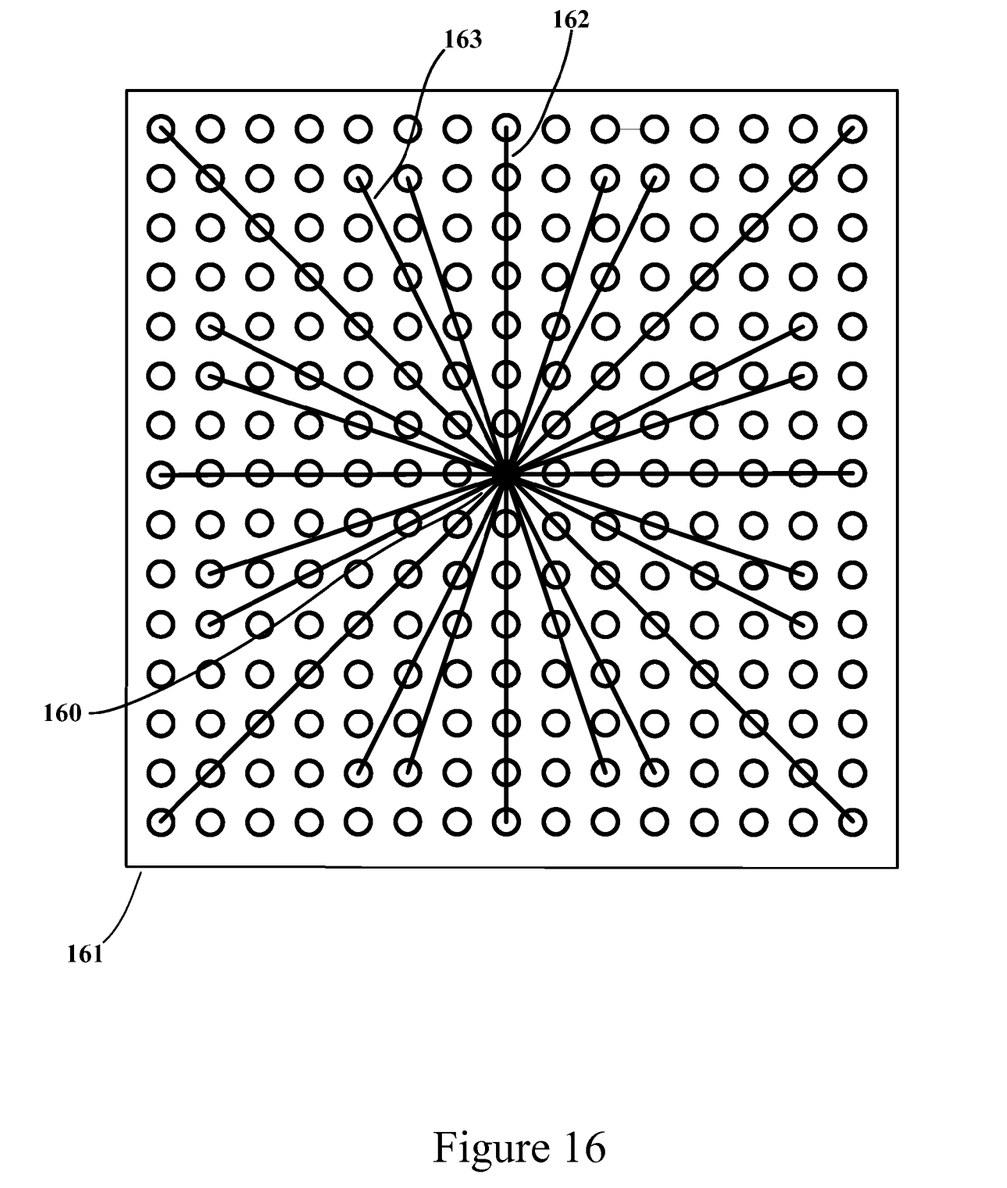
FIG. 16 shows lines of pixels passing through a point of interest within an image area.

Another example of the choice of lines of pixels for processing according to the invention is shown in FIG. 16. In this case lines of pixels have been selected which pass through a point of interest (160) which is situated within a rectangular area of interest (161). Along each line, cumulative sums of pixel values are formed in opposing directions and the opposing values at each pixel position are multiplied together to obtain product values for all the pixels along each line. As can be seen from FIG. 16, not all the lines of pixels comprise the same number of pixels. For example the line (162) comprises 15 pixels, whereas the line (163) comprises seven pixels. In order to have comparable values for pixels on different lines, the values should be weighted in inverse proportion to the number of pixels contributing to the respective line of pixels. The weighted values can then be non-linearly processed and compared with a threshold to determine the extent of a region of interest.

Figure 17:
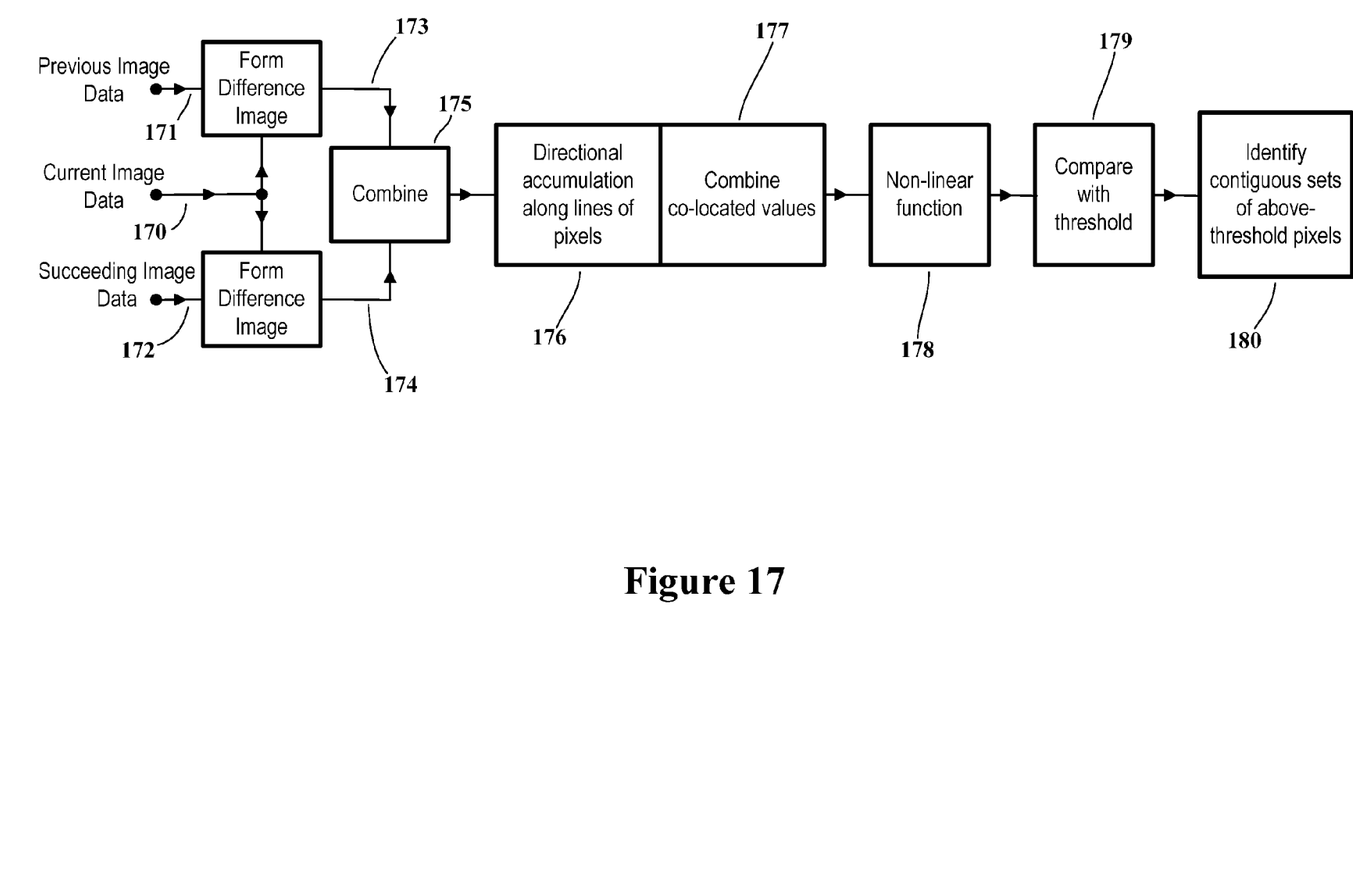
FIG. 17 shows a system according to an embodiment of the invention for identifying one or more regions within an image forming part of a sequence of images.

FIG. 17 shows a typical process according to the invention for identifying regions within an image forming part of a sequence of images. Pixel value data (170) for the image to be analysed is input to the system, together with: pixel value data (171) for a preceding image in the sequence; and, pixel value data (172) for a succeeding image in the sequence. A backward difference-image (173) and a forward difference-image (174) are formed from the respective differences between the pixel value data (170) and the preceding image data (171) and the succeeding image data (172). As described above, these difference-images may be formed by subtracting the values of co-located pixels, or by using a motion estimation process to form forward and backward DFDs.

The pixel values of co-located pixels in the forward difference-image (174) and the backward difference-image (173) are combined in a combination process (175). This process may take a simple average of co-located pixel values, a non-linear combination (such as the greater of the two pixel values), or a weighted average (with weights derived from a motion estimation process for example).

The output of the combination process (175) is a set of pixel values of a difference-image where high values are indicative of the edges of image regions. This is output is passed to a directional accumulation process (176) in which pixel values are directionally accumulated along straight line of pixels in opposing directions along each line.

The accumulated values of co-located pixels are combined in a combination process (177). A suitable combination method is the multiplication of pixel values as described above with reference to FIG. 2. The output of this combination process is a set of pixel values for the pixels comprising the lines of pixels used in the directional accumulation process (176). Note that, depending on the choice of lines for accumulation, not all pixel positions within the image will have values output from the combination process (177).

The pixel values from the combination process (177) are input to a non-linear function (178), that reduces the dynamic range of the values (for example the logarithmic clipping process described above). The non-linearly processed values are compared with a threshold in a comparison process (179) and contiguous regions where the threshold is exceeded are identified as image regions in a region identification process (180).

It is possible that several regions are identified, with the different regions separated from each other by locations where the non-linearly processed pixel values are less than the threshold. It may be necessary to apply some other qualification to the detected regions; for example regions of small extent, or small area may be disregarded.

The examples shown above have analysed pixels within rectangular regions. However the invention can be applied to regions of arbitrary shape by choosing lines of pixels that include at least a proportion of the pixels within the area to be analysed.

Images may be re-sampled prior to analysis. If only low resolution segmentation is required, then a sub-sampled image comprising fewer pixels can be used for the segmentation process.

The invention is applicable to both interlaced and progressive image sequences. In the case of interlace, there are no pixels that are co-located pixels on adjacent images of the sequence. It is thus necessary to spatially re-sample one or both images of a pair of adjacent images to obtain co-located pixels.

Although processing of DFD images from a temporal sequence of images has been described, the invention is applicable to other image sequences, such as a sequence changing viewpoints. Difference-images representing the respective value differences between co-located pixels in images at different positions in the sequence can be used. And, provided vectors can be derived that describe the displacement of objects between different images of the sequence, a DFD can be formed from two images in the sequence and this DFD can be processed according to the invention to identify one or more image regions.

Typically luminance values are used to form the DFD or difference-image, however other values, including colour separation values (RGB, CMY, etc.) or colour difference values (U, V, $C_B$, $C_R$, etc.) can be used.

The invention claimed is:

1. A method of identifying a region within a chosen image that is part of an image sequence, the method comprising:
    forming difference-image pixel values from the chosen image and at least one other image in the image sequence;
    forming first directionally-accumulated difference-image pixel values by accumulating difference-image pixel values in a first image direction;
    forming second directionally-accumulated difference-image pixel values by accumulating difference-image pixel values in a second image direction;
    combining the respective co-located first directionally-accumulated difference-image pixel values and the second directionally-accumulated difference-image pixel values to form combined directionally-accumulated difference-image pixel values; and
    utilizing the combined directionally-accumulated difference-image pixel values in identifying said region;
    further comprising:
    forming third directionally-accumulated difference-image pixel values by accumulating difference-image pixel values in a third image direction; and
    forming fourth directionally-accumulated difference-image pixel values by accumulating difference-image pixel values in a fourth image direction,
    wherein the third and fourth directions are opposing.

2. A method according to claim 1, wherein difference-image pixel values are accumulated along straight lines of pixels.

3. A method according to claim 1, wherein forming difference-image pixel values from the chosen image and at least one other image in the image sequence comprises receiving a displaced frame difference (DFD) comprising displaced frame difference values of pixels derived from a motion estimation process applied to images in the sequence.

4. A method according to claim 1, wherein the said at least one other image comprises at least an image earlier in the sequence than the said chosen image and at least an image later in the sequence than the said chosen image.

5. A method according to claim 1, wherein the first and second directions are opposing.

6. A method according to claim 1, wherein the first and second directions are intersecting lines.

7. A method according to claim 1, wherein combining co-located directionally-accumulated difference-image pixel values comprises:
 combining the first and second directionally-accumulated difference-image pixel values to form first combined directionally-accumulated difference-image pixel values; and
 combining the third and fourth directionally-accumulated difference-image pixel values to form second combined directionally-accumulated difference-image pixel values.

8. A method according to claim 1, wherein combining co-located directionally-accumulated difference-image pixel values comprises multiplying co-located directionally-accumulated difference-image pixel values together to form a product of accumulated pixel values.

9. A method according to claim 8, wherein the magnitude of a product of accumulated pixel values for a pixel is used to identify that pixel as part of an image region.

10. A method according to claim 9, wherein the magnitude of a weighted sum of product values for a pixel is compared with a threshold and that pixel is considered to form part of an image region when the threshold is exceeded.

11. A method according to claim 10, wherein a product of pixel values is modified by a non-linear function prior to comparison.

12. Apparatus for identifying a region within a chosen image that is part of an image sequence, comprising:
 a difference-image store for holding difference-image pixel values;
 a first accumulator forming first directionally-accumulated difference-image pixel values by accumulating difference-image pixel values in a first image direction;
 a second accumulator forming second directionally-accumulated difference-image pixel values by accumulating difference-image pixel values in a second image direction; and
 a multiplier forming products of directionally-accumulated difference-image pixel values,
 wherein co-located pixel values resulting from accumulation in opposing directions are multiplied together.

13. Apparatus according to claim 12, wherein co-located pixel values derived from values accumulated along intersecting lines are multiplied together.

14. Apparatus according to claim 12, wherein the magnitude of a product of accumulated pixel values for a pixel is used to identify that pixel as part of an image region.

15. Apparatus according to claim 14, wherein the magnitude of a weighted sum of product values for a pixel is compared with a threshold and that pixel is considered to form part of an image region when the threshold is exceeded.

16. A non-transitory computer readable medium storing a computer program product having instructions thereon that, when executed, cause one or more programmable apparatuses to implement a method of identifying a region within a chosen image that is part of an image sequence, the method comprising:
 forming difference-image pixel values from the chosen image and at least one other image in the image sequence;
 forming first directionally-accumulated difference-image pixel values by accumulating difference-image pixel values in a first image direction;
 forming second directionally-accumulated difference-image pixel values by accumulating difference-image pixel values in a second image direction;
 combining the respective co-located first directionally-accumulated difference-image pixel values and the second directionally-accumulated difference-image pixel values to form combined directionally-accumulated difference-image pixel values;
 utilizing the combined directionally-accumulated difference-image pixel values in identifying said region;
 forming third directionally-accumulated difference-image pixel values by accumulating difference-image pixel values in a third image direction; and
 forming fourth directionally-accumulated difference-image pixel values by accumulating difference-image pixel values in a fourth image direction,
 wherein the third and fourth directions are opposing.

17. The non-transitory computer readable medium of claim 16 having instructions thereon that, when executed, cause one or more programmable apparatuses to implement a method of identifying a region within a chosen image that is part of an image sequence, wherein combining co-located directionally-accumulated difference-image pixel values comprises:
 combining the first and second directionally-accumulated difference-image pixel values to form first combined directionally-accumulated difference-image pixel values; and
 combining the third and fourth directionally-accumulated difference-image pixel values to form second combined directionally-accumulated difference-image pixel values.

* * * * *